United States Patent
Abdo et al.

(10) Patent No.: US 12,106,528 B2
(45) Date of Patent: Oct. 1, 2024

(54) GENERATING SCENE FLOW LABELS FOR POINT CLOUDS USING OBJECT LABELS

(71) Applicant: Waymo LLC, Mountain View, CA (US)

(72) Inventors: Nichola Abdo, Mountain View, CA (US); Jonathon Shlens, San Francisco, CA (US); Zhifeng Chen, Sunnyvale, CA (US); Christopher John Sweeney, San Francisco, CA (US); Philipp Florian Jund, Zurich (CH)

(73) Assignee: Waymo LLC, Mountain View, CA (US)

( * ) Notice: Subject to any disclaimer, the term of this patent is extended or adjusted under 35 U.S.C. 154(b) by 406 days.

(21) Appl. No.: 17/684,334

(22) Filed: Mar. 1, 2022

(65) Prior Publication Data

US 2022/0319054 A1    Oct. 6, 2022

Related U.S. Application Data

(60) Provisional application No. 63/155,255, filed on Mar. 1, 2021.

(51) Int. Cl.
*G06T 9/00* (2006.01)
*G06F 18/214* (2023.01)

(52) U.S. Cl.
CPC .......... *G06T 9/002* (2013.01); *G06F 18/2148* (2023.01)

(58) Field of Classification Search
CPC .......... G06T 9/002; G06T 2207/10016; G06T 2207/10028; G06T 2207/20081;
(Continued)

(56) References Cited

U.S. PATENT DOCUMENTS 11,216,663 B1 * 1/2022 Ettinger ............... G05D 1/0016
11,430,145 B2 * 8/2022 Siddiqui ................ G06T 7/579
(Continued)

FOREIGN PATENT DOCUMENTS

CN    110097553 B * 5/2023 .......... G06K 9/4671
EP    1596609 A2 * 11/2005 .......... H04N 13/161
(Continued)

OTHER PUBLICATIONS

Baker et al., "A database and evaluation methodology for optical flow," International Journal of Computer Vision, Nov. 30, 2010, 92(1):1-31.
(Continued)

*Primary Examiner* — Mahendra R Patel
(74) *Attorney, Agent, or Firm* — Fish & Richardson P.C.

(57) ABSTRACT

Methods, systems, and apparatus, including computer programs encoded on computer storage media, for predicting scene flow. One of the methods includes obtaining a current point cloud representing an observed scene at a current time point; obtaining object label data that identifies a first three-dimensional region in the observed scene; determining, for each current three-dimensional point that is within the first three-dimensional region and using the object label data, a respective preceding position of the current three-dimensional point at a preceding time point in a reference frame of the sensor at the current time point; and generating, using the preceding positions, a scene flow label for the current point cloud that comprises a respective ground truth motion vector for each of a plurality of the current three-dimensional points.

20 Claims, 5 Drawing Sheets

(58) Field of Classification Search
CPC ........... G06T 2207/20084; G06T 7/269; G06F 18/2148; G06N 3/0464; G06N 3/049; G06V 10/82; G06V 20/58; H04N 19/46; H04N 19/52; H04N 19/597
USPC ....................................................... 382/157
See application file for complete search history.

(56) References Cited

U.S. PATENT DOCUMENTS

| | | | | |
|---|---|---|---|---|
| 11,508,095 | B2* | 11/2022 | Mammou | G06T 9/001 |
| 11,537,808 | B2* | 12/2022 | Crouch | G06F 18/22 |
| 11,562,507 | B2* | 1/2023 | Kim | G06T 9/00 |
| 11,585,925 | B2* | 2/2023 | Crouch | G01S 17/42 |
| 11,594,011 | B2* | 2/2023 | Lu | G01S 17/89 |
| 11,627,314 | B2* | 4/2023 | Tourapis | H04N 19/184 375/240.18 |
| 11,694,333 | B1* | 7/2023 | Knuffman | G06V 10/454 382/154 |
| 11,711,544 | B2* | 7/2023 | Tourapis | H04N 19/467 375/240.08 |
| 2011/0274343 | A1* | 11/2011 | Krishnaswamy | G06V 10/40 382/154 |
| 2012/0195471 | A1* | 8/2012 | Newcombe | G06T 7/194 382/106 |
| 2015/0331111 | A1* | 11/2015 | Newman | G01S 7/4808 356/4.01 |
| 2016/0321820 | A1* | 11/2016 | Ely | G06T 7/246 |
| 2017/0116781 | A1* | 4/2017 | Babahajiani | G06T 15/506 |
| 2017/0128137 | A1* | 5/2017 | Qureshi | A61B 34/30 |
| 2018/0161986 | A1* | 6/2018 | Kee | G06V 20/10 |
| 2019/0147220 | A1* | 5/2019 | McCormac | G06V 10/7715 382/103 |
| 2019/0311487 | A1* | 10/2019 | Xiao | G01S 17/89 |
| 2022/0092291 | A1* | 3/2022 | Lai | G06V 20/70 |
| 2022/0279203 | A1* | 9/2022 | Mangan | H04N 19/597 |

FOREIGN PATENT DOCUMENTS

| | | | | |
|---|---|---|---|---|
| EP | 2385496 | A1 * | 11/2011 | ......... G06K 9/00201 |
| EP | 3886043 | A1 * | 9/2021 | ........... G06K 9/2072 |
| KR | 1020190089196 | | 7/2019 | |
| WO | WO-2021007320 | A1 * | 1/2021 | ......... G06K 9/00201 |
| WO | WO-2021067665 | A2 * | 4/2021 | ........... G06K 9/6256 |
| WO | WO-2022061758 | A1 * | 3/2022 | |

OTHER PUBLICATIONS

Behl et al., "Pointflownet: Learning representations for rigid motion estimation from point clouds," Proceedings of the IEEE/CVF Conference on Computer Vision and Pattern Recognition (CVPR), 2019, pp. 7962-7971.
Bousmalis et al., "Using simulation and domain adaptation to improve efficiency of deep robotic grasping," 2018 IEEE International Conference on Robotics and Automation (ICRA), May 21-25, 2018, 9 pages.
Butler et al., "A naturalistic open source movie for optical flow evaluation," European conference on computer vision, 2012, pp. 611-625.
Caesar et al., "nuScenes: A multimodal dataset for autonomous driving," Proceedings of the IEEE/CVF Conference on Computer Vision and Pattern Recognition, 2020, pp. 11621-11631.
Casas et al., "Intentnet: Learning to predict intention from raw sensor data," Proceedings of The 2nd Conference on Robot Learning, 2018, 87:947-956.
Chai et al., "Anguelov. Multipath: Multiple probabilistic anchor trajectory hypotheses for behavior prediction," CoRR, Oct. 12, 2019, arXiv:1910.05449, 14 pages.
Chang et al., "Argoverse: 3D tracking and forecasting with rich maps," Proceedings of the IEEE Conference on Computer Vision and Pattern Recognition, 2019, pp. 8748-8757.
Chen et al., "Leveraging semi-supervised learning in video sequences for urban scene segmentation," European Conference on Computer Vision (ECCV), Nov. 5, 2020, 19 pages.
Chu et al., "Local path planning for off-road autonomous driving with avoidance of static obstacles," IEEE Transactions on Intelligent Transportation Systems, Dec. 2012, 13(4):1599-1616.
Dewan et al., "Rigid scene flow for 3D lidar scans," 2016 IEEE/RSJ International Conference on Intelligent Robots and Systems (IROS), Oct. 9-14, 2016, pp. 1765-1770.
Ding et al., "1st place solution for waymo open dataset challenge—3D detection and domain adaptation," CoRR, Jun. 28, 2020, arXiv:2006. 15505, 8 pages.
Distill.pub [online], "Deconvolution and Checkerboard Artifacts," Oct. 14, 2016, retrieved on Aug. 15, 2023, retrieved from URL<https://distill.pub/2016/deconv-checkerboard/?ref=mlq-ai/>, 10 pages.
Dolgov et al., "Practical search techniques in path planning for autonomous driving," Ann Arbor, Jun. 2008, 1001(48105):18-80.
Fan et al., "Pointrnn: Point recurrent neural network for moving point cloud processing," CoRR, Oct. 18, 2019, arXiv:1910.08287, 15 pages.
Filatov et al., "Any motion detector: Learning class-agnostic scene dynamics from a sequence of lidar point clouds," CoRR, Apr. 24, 2020, arXiv:2004.11647, 7 pages.
Geiger et al., "Are we ready for autonomous driving? the kitti vision benchmark suite," 2012 IEEE Conference on Computer Vision and Pattern Recognition, Jun. 16-21, 2012, pp. 3354-3361.
Geiger et al., "Vision meets robotics: The KITTI dataset," The International Journal of Robotics Research, Aug. 23, 2013, 32(11):1231-1237.
Glorot et al., "Understanding the difficulty of training deep feedforward neural networks," Proceedings of the thirteenth international conference on artificial intelligence and statistics, 2010, pp. 249-256.
Gu et al., "Hplflownet: Hierarchical permutohedral lattice flownet for scene flow estimation on large-scale point clouds," Proceedings of the IEEE Conference on Computer Vision and Pattern Recognition, 2019, pp. 3254-3263.
Gualtieri et al., "High precision grasp pose detection in dense clutter," 2016 IEEE/RSJ International Conference on Intelligent Robots and Systems (IROS), Oct. 9-14, 2016, pp. 598-605.
Houston et al., "One thousand and one hours: Self-driving motion prediction dataset," CoRR, Jun. 25, 2020, arXiv:2006.14480, 10 pages.
International Search Report and Written Opinion in International Appln. No. PCT/US2022/018349, Jun. 20, 2022, 10 pages.
Kingma et al., "Adam: A method for stochastic optimization," CoRR, Dec. 22, 2014, arXiv:1412.6980, 15 pages.
Kondermann et al., "On performance analysis of optical flow algorithms," Outdoor and Large-Scale Real-World Scene Analysis, 2012, pp. 329-355.
Ladicky et al., "Joint optimization for object class segmentation and dense stereo reconstruction," International Journal of Computer Vision, Sep. 7, 2011, 100(2):122-133.
Lang et al., "PointPillars: Fast Encoders for Object Detection from Point Clouds," CoRR, Dec. 2018, arxiv.org/abs/1812.05784, 9 pages.
Liu et al., "Flownet3d: Learning scene flow in 3D point clouds," Proceedings of the IEEE Conference on Computer Vision and Pattern Recognition, 2019, pp. 529-537.
Liu et al., "MeteorNet: Deep learning on dynamic 3D point cloud sequences," Proceedings of the IEEE International Conference on Computer Vision, 2019, pp. 9246-9255.
Luo et al., "Fast and furious: Real time end-to-end 3D detection, tracking and motion forecasting with a single convolutional net," Proceedings of the IEEE Conference on Computer Vision and Pattern Recognition, 2018, pp. 3569-3577.
Mahjourian et al., "Unsupervised learning of depth and ego-motion from monocular video using 3D geometric constraints," Proceedings of the IEEE Conference on Computer Vision and Pattern Recognition (CVPR), 2018, pp. 5667-5675.
Mayer et al., "A large dataset to train convolutional networks for disparity, optical flow, and scene flow estimation," Proceedings of the IEEE Conference on Computer Vision and Pattern Recognition (CVPR), Jun. 2016, pp. 4040-4048.

(56) References Cited

OTHER PUBLICATIONS

McLachlan, "Iterative reclassification procedure for constructing an asymptotically optimal rule of allocation in discriminant analysis," Journal of the American Statistical Association, Mar. 1, 1973, 70(350):365-369.

McNaughton et al., "Motion planning for autonomous driving with a conformal spatiotemporal lattice," 2011 IEEE International Conference on Robotics and Automation, May 9-13, 2011, pp. 4889-4895.

Menze et al., "Object scene flow for autonomous vehicles," Proceedings of the IEEE conference on computer vision and pattern recognition, 2015, pp. 3061-3070.

Morales et al., "Ground truth evaluation of stereo algorithms for real world applications," Asian Conference on Computer Vision, 2010, pp. 152-162.

Ngiam et al., "Starnet: Targeted computation for object detection in point clouds," CoRR, Aug. 29, 2019, arXiv:1908.11069, 12 pages.

Papandreou et al., "Weakly-and semi-supervised learning of a deep convolutional network for semantic image segmentation," Proceedings of the IEEE International Conference on Computer Vision (ICCV), 2015, pp. 1742-1750.

Pfeiffer et al., "Exploiting the power of stereo confidences," Proceedings of the IEEE Conference on Computer Vision and Pattern Recognition (CVPR), 2013, pp. 297-304.

Qi "Pointnet++: Deep hierarchical feature learning on point sets in a metric space," Advances in Neural Information Processing Systems 30, 2017, pp. 5099-5108.

Qi et al., "Pointnet: Deep learning on point sets for 3D classification and segmentation," Proceedings of the IEEE Conference on Computer Vision and Pattern Recognition, 2017, pp. 652-660.

Ronneberger et al., "Convolutional networks for biomedical image segmentation," International Conference on Medical image computing and computer-assisted intervention, Nov. 18, 2015, pp. 234-241.

Saxena et al., "Learning depth from single monocular images," Advances in Neural Information Processing Systems 18, 2005, pp. 1161-1168.

Saxena et al., "Robotic grasping of novel objects using vision," The International Journal of Robotics Research, Feb. 1, 2008, 27(2):157-173.

Scharstein et al., "A taxonomy and evaluation of dense two-frame stereo correspondence algorithms," International Journal of Computer Vision, Apr. 2002, 47(1-3):7-42.

Scudder, "Probability of error of some adaptive pattern recognition machines," IEEE Transactions on Information Theory, Jul. 1965, pp. 363-371.

Shen et al., "Lingvo: a modular and scalable framework for sequence-to-sequence modeling," CoRR, Feb. 21, 2019, arXiv:1902.08295, 17 pages.

Sun et al., "Scalability in perception for autonomous driving: Waymo open dataset," Proceedings of the IEEE/CVF Conference on Computer Vision and Pattern Recognition, 2020, pp. 2446-2454.

Thrun et al., "Stanley: The robot that won the darpa grand challenge," Journal of Field Robotics, Sep. 2006, 23(9):661-692.

Ushani et al., "A learning approach for real-time temporal scene flow estimation from lidar data," 2017 IEEE International Conference on Robotics and Automation (ICRA), May 29, 2017, pp. 5666-5673.

Ushani et al., "Feature learning for scene flow estimation from LIDAR," Proceedings of The 2nd Conference on Robot Learning, 2018, pp. 283-292.

Viereck et al., "Learning a visuomotor controller for real world robotic grasping using simulated depth images," Proceedings of the 1st Annual Conference on Robot Learning, 2017, 78:291-300.

Wang et al., "Deep parametric continuous convolutional neural networks," Proceedings of the IEEE Conference on Computer Vision and Pattern Recognition, 2018, pp. 2589-2597.

Wang et al., "Flownet3d++: Geometric losses for deep scene flow estimation," Proceedings of the IEEE/CVF Winter Conference on Applications of Computer Vision (WACV), 2020, pp. 91-98.

Wu et al., "Motionnet: Joint perception and motion prediction for autonomous driving based on bird's eye view maps," Proceedings of the IEEE/CVF Conference on Computer Vision and Pattern Recognition, 2020, pp. 11385-11395.

Wu et al., "Pointconv: Deep convolutional networks on 3D point clouds," CoRR, Nov. 17, 2018, arXiv:1811.07246, 10 pages.

Wu et al., "PointPWC-net: A coarse-to-fine network for supervised and self-supervised scene flow estimation on 3D point clouds," CoRR, Nov. 27, 2019, arXiv:1911.12408, 25 pages.

Yu et al., "Bdd100k: A diverse driving dataset for heterogeneous multitask learning," Proceedings of the IEEE/CVF Conference on Computer Vision and Pattern Recognition (CVPR), 2020, pp. 2636-2645.

Zhou et al., "Real-time KD-tree construction on graphics hardware," ACM Transactions on Graphics (TOG), Dec. 1, 2008, 27(5):1-11.

Zhou et al., "End-to-end multi-view fusion for 3D object detection in lidar point clouds," Proceedings of the Conference on Robot Learning, 2020, 100:923-932.

Zhou et al., "VoxelNet: End-to-End learning for point cloud based 3D object detection," Proceedings of the IEEE Conference on Computer Vision and Pattern Recognition, 2018, pp. 4490-4499.

International Preliminary Report on Patentability in International Appln. No. PCT/US2022/018349, Aug. 29, 2023, 7 pages.

\* cited by examiner

GENERATING SCENE FLOW LABELS FOR POINT CLOUDS USING OBJECT LABELS

CROSS-REFERENCE TO RELATED APPLICATION

This application claims the benefit of U.S. Provisional Application No. 63/155,255, filed on Mar. 1, 2021. The disclosure of the prior application is considered part of and is incorporated by reference in the disclosure of this application.

BACKGROUND

This specification relates to predicting motion in a scene of an environment. For example, the prediction may be made by an autonomous vehicle navigating through the environment. Autonomous vehicles include self-driving cars, boats, and aircraft. Autonomous vehicles use a variety of on-board sensors and computer systems to measure nearby objects and use these measurements to make control and navigation decisions.

BRIEF DESCRIPTION OF THE DRAWINGS

Like reference numbers and designations in the various drawings indicate like elements.

DETAILED DESCRIPTION

Figure 1:
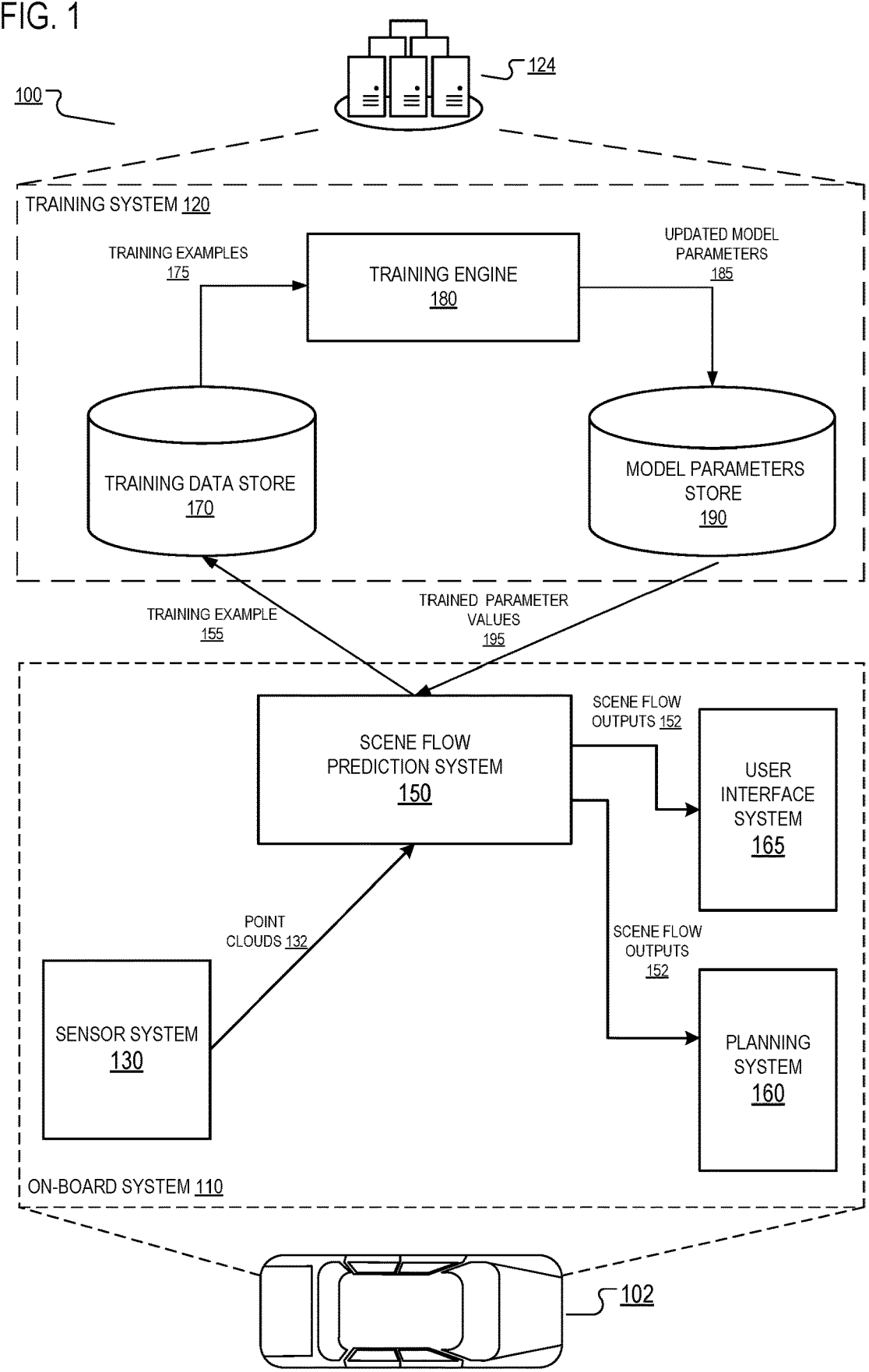
FIG. 1 is a diagram of an example system.

This specification describes a system implemented as computer programs on one or more computers in one or more locations that generates scene flow labels for point clouds.

A "scene flow label" for a given point cloud identifies, for some or all of the three-dimensional points in the given point cloud, a respective motion vector that represents the motion of the point as of the time that the given point cloud was generated, e.g., relative to a preceding point cloud that was captured earlier in time than the given point cloud. For example, the motion vector can specify the velocity of the point along each of one or more directions.

Accurately predicting the scene flow of a scene, i.e., accurately predicting motion vectors for the points in a point cloud representing the scene, can provide an important and useful signal to an autonomous vehicle or another agent, e.g., a robot, navigating through an environment. For example, accurately predicting the scene flow can enable the autonomous vehicle or other agent to identify potential obstacles, distinguish between parts of the scene that are static and dynamic, estimate the trajectories of objects in the scene, and assist in a variety of downstream tasks, e.g., object detection, object tracking, and image or point cloud segmentation, that are useful to effective operation.

Some existing techniques attempt to predict scene flow for a scene directly from point clouds, e.g., those generated by a LiDAR sensor or other laser sensor. In particular, these techniques use a neural network that takes as input two point clouds and directly outputs the predicted motion vectors for the points in one of the two point clouds.

However, these neural networks are difficult to train because accurate labels for training data cannot be effectively obtained using existing techniques. In particular, for point clouds generated from laser sensor data, no information about the correspondence between points in one point cloud and points in another point cloud captured at a different time by the same sensor is available from the laser sensor. That is, the sensor does not provide any information about which point in an earlier point cloud represents a return from the same physical point in the environment as any given point in a later point cloud. Therefore, generating a "ground truth" motion vector for a given point in the later point cloud that accurately reflects the actual motion of the given point is difficult.

This specification describes techniques for generating scene flow labels in a way that overcomes these difficulties and results in training examples that have accurate labels and can be used to train a neural network to accurately predict scene flow. In particular, by generating scene flow labels using object label data that identifies the positions of objects within point clouds, the described techniques can overcome the lack of correspondence to generate ground truth motion vectors that accurately characterize the motion of the points in a point cloud. That is, the described techniques use object label data to accurately identify the previous locations of points in a current point cloud, allowing for the motion of these points to be accurately estimated.

By training a neural network on training data that is generated using scene flow labels that are generated as described in this specification, the neural network will be able to more accurately predict scene flow than a neural network trained on training data generated using existing techniques. Accordingly, once the trained neural network is deployed on-board an autonomous vehicle or another agent, the autonomous vehicle or other agent will be able to more effectively navigate through the environment.

Additionally, existing neural networks that predict scene flow directly from point clouds are only computationally tractable for point clouds with relatively few points, e.g., ten thousand points. That is, existing neural networks have architectures that will consume an excessive amount of computational resources, e.g., memory and processor cycles, if the point clouds that are provided as input have significantly more than ten thousand points. However, systems that are deployed on-board autonomous vehicles are required to remain computationally efficient even when processing much larger point clouds. For example, point clouds that are generated by laser sensors on autonomous vehicles can contain over one hundred thousand points due to the complexity of real-world scenes encountered by autonomous vehicles. Thus, existing neural networks cannot reliably be deployed on-board an autonomous vehicle.

This specification describes an architecture for a neural network that can efficiently process these large point clouds with minimal latency. Thus, the described architecture is optimized for being deployed on an autonomous vehicle because it can be used to make low latency accurate predictions even for large point clouds.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 include one or more laser sensors, e.g., lidar sensors, that generate point clouds 132 by detecting reflections of laser light, and optionally one or more other sensors, e.g., radar sensors that detect reflections of radio waves, camera sensors that detect reflection of visible light, and so on.

A point cloud generally includes multiple points that represent a sensor measurement of a scene in an environment captured by one or more sensors. Each point has a location in a specified coordinate system, e.g., a three-dimensional coordinate system centered at the sensor, and can optionally be associated with additional features, e.g., intensity, second return, and so on.

As the vehicle 102 navigates through the environment, various sensors capture measurements of the environment. For example, a laser sensor can repeatedly capture point clouds during the navigation.

Once the sensor subsystems 130 generate the point clouds 132, the sensor subsystems 130 can send the point clouds 132 to a scene flow prediction system 150, also on-board the vehicle 102.

The scene flow prediction system 150 processes the point clouds 132 to generate a scene flow output 152.

More specifically, the scene flow prediction system 150 processes the most recent point cloud that was received by the scene prediction system 150, i.e., a point cloud generated at a most recent time point, and an earlier point cloud, i.e., a point cloud that was generated at an earlier time point than the most recent time point, to generate a scene flow output 152 that includes a respective motion vector for each of a plurality of points in the most recent point cloud.

The motion vector for a given point in the most recent point cloud characterizes the predicted motion, i.e., as predicted by the scene flow prediction system 150, of the given point at the most recent time point. As a particular example, the motion vector can include, for each of multiple directions, a respective velocity component in the direction in the reference frame of the laser sensor at the most recent time point. The velocity component in a given direction represents the predicted velocity of the point along the given direction at the most recent time point. For example, the motion vector can include respective velocities, e.g., in meters/second or another appropriate unit of measurement, for each of three dimensions: the x direction, the y direction, and the z direction.

To generate the scene flow output 152, the scene flow prediction system 150 processes the earlier point cloud and the most recent point cloud using a scene flow prediction neural network in accordance with trained parameter values 195 of the scene flow prediction neural network. That is, the scene flow prediction neural network is configured to receive as input the two point clouds and to generate as output the scene flow output 152.

The scene flow prediction neural network can generally have any appropriate architecture that allows the neural network to map two point clouds to a respective motion vector for each of multiple points in one of the input point clouds.

One example architecture for the scene flow prediction neural network is described in more detail below with reference to FIGS. 4 and 5. In particular, the example architecture described below with reference to FIGS. 4 and 5 allows the neural network to effectively make low-latency predictions even for large point clouds 132 that represent dynamic real-world scenes.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the scene flow outputs 152 generated by the scene flow prediction system 150 to one or more other on-board systems of the vehicle 102, e.g., the planning system 160 and/or a user interface system 165.

When the planning system 160 receives the scene flow outputs 152, the planning system 160 can use the scene flow outputs 152 to generate planning decisions that plan a future trajectory of the vehicle, i.e., to generate a new planned vehicle path. Generally, the planning system 160 can use the scene flow outputs 152 as part of planning a future trajectory in any of a variety of ways. For example, the planning system 160 can use the scene flow outputs 152 to distinguish between parts of the scene that are static and dynamic, e.g., by determining that points that have a velocity above a threshold in any direction are dynamic points. As another example, the planning system 160 can estimate the trajectories of objects in the scene using the scene flow outputs 152, e.g., based on the motion vectors for the points in the point cloud. As another example, the planning system 160 can use the scene flow outputs 152 as inputs when performing a variety of downstream tasks, e.g., object detection, object tracking, and image or point cloud segmentation, that are used in planning the future trajectory.

For example, the scene flow outputs 152 may contain a prediction that one or more points on a given object in the environment have a velocity that will cause the given object to intersect with a currently planned path for the vehicle 102, potentially causing a collision. In this example, the planning system 160 can generate a new planned vehicle path that avoids the potential collision and cause the vehicle 102 to follow the new planned path, e.g., by autonomously controlling the steering of the vehicle.

When the user interface system 165 receives the scene flow outputs 152, the user interface system 165 can use the scene flow outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the scene flow outputs 152 may contain a prediction that indicates that a particular object will interest the current path of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

The scene flow prediction system 150 can obtain the trained parameter values 195, i.e., the trained parameter values of the scene flow neural network used by the scene flow prediction system 150, from a model parameters store 190 in the training system 120.

The training system 120 is typically hosted within a data center 124, which can be a distributed computing system having hundreds or thousands of computers in one or more locations.

The training system 120 receives raw training examples from vehicles operating in the real world and/or from other sources, e.g., synthetic training examples generated in simulation or training examples generated by sensors on other agents, e.g., robots or other moving agents. For example, the training system 120 can receive raw training examples 155 from the vehicle 102 and one or more other agents that are in communication with the training system 120.

Each raw training example 155 can be processed by the training system 120 to generate a new training example 175. In particular, each raw training example 155 includes two point clouds: (i) a current point cloud generated at a current time point and representing an observed scene in an environment the current time point and (ii) an earlier point cloud generated at an earlier time point and representing the observed scene in the environment at the earlier time point.

The new training example 175 includes (i) the current point cloud generated at a current time point and representing an observed scene in an environment the current time point, (ii) the earlier point cloud generated at an earlier time point and representing the observed scene in the environment at the earlier time point, and (iii) a scene flow label that includes a respective ground truth motion vector for each of a plurality of the points in the current point cloud. The ground truth motion vector represents a target motion vector that should be generated by the scene flow neural network by processing the earlier point cloud and the current point cloud.

Generally, the training system 120 generates the new training example 175 by generating the scene flow label for the current point cloud in the raw training example 155 using object label data that identifies three-dimensional regions of the environment that contain objects.

Generating a training example 175 is described below with reference to FIGS. 2 and 3.

The training data store 170 provides training examples 175 to a training engine 180, also hosted in the training system 120. The training engine 180 uses the training examples 175 to update the parameters of the scene flow neural network, and provides the updated model parameters 185 to the model parameters store 190. That is, the training engine 180 trains the scene flow neural network on the training examples 175 to minimize a loss function using conventional gradient-based machine learning techniques. For example, the loss function can measure, for each training example 175, the average error, e.g., the average L2 loss, between the predicted motion vector for a given point and the ground truth motion vector for the given point. Once the parameter values of the scene flow neural network have been fully trained, the training system 120 can send the trained parameter values 195 to the scene flow prediction system 150, e.g., through a wired or wireless connection.

While this specification describes that scene flow outputs are generated on-board an autonomous vehicle, more generally, the described techniques can be implemented on any system of one or more computers that receives point clouds of scenes in an environment.

As one example, the scene flow predictions can be made on-board a different type of agent that has a laser sensor and that interacts with objects as it navigates through an environment. For example, the scene flow predictions can be made by one or more computers embedded within a robot or other agent.

As another example, the scene flow predictions can be made by one or more computers that are remote from the agent and that receive point clouds captured by the laser sensor of the agent. In some of these examples, the one or more computers can use the location predictions to generate control decisions for controlling the agent and then provide the control decisions to the agent for execution by the agent.

As another example, the scene flow predictions may be made in a computer simulation of a real-world environment being navigated through by a simulated autonomous vehicle and the target agents. Generating these predictions in simulation may assist in controlling the simulated vehicle and in testing the realism of certain situations encountered in the simulation. More generally, generating these predictions in simulation can be part of testing the control software of a real-world autonomous vehicle before the software is deployed on-board the autonomous vehicle, of training one or more machine learning models that will later be deployed on-board the autonomous vehicle, or both.

Figure 2:
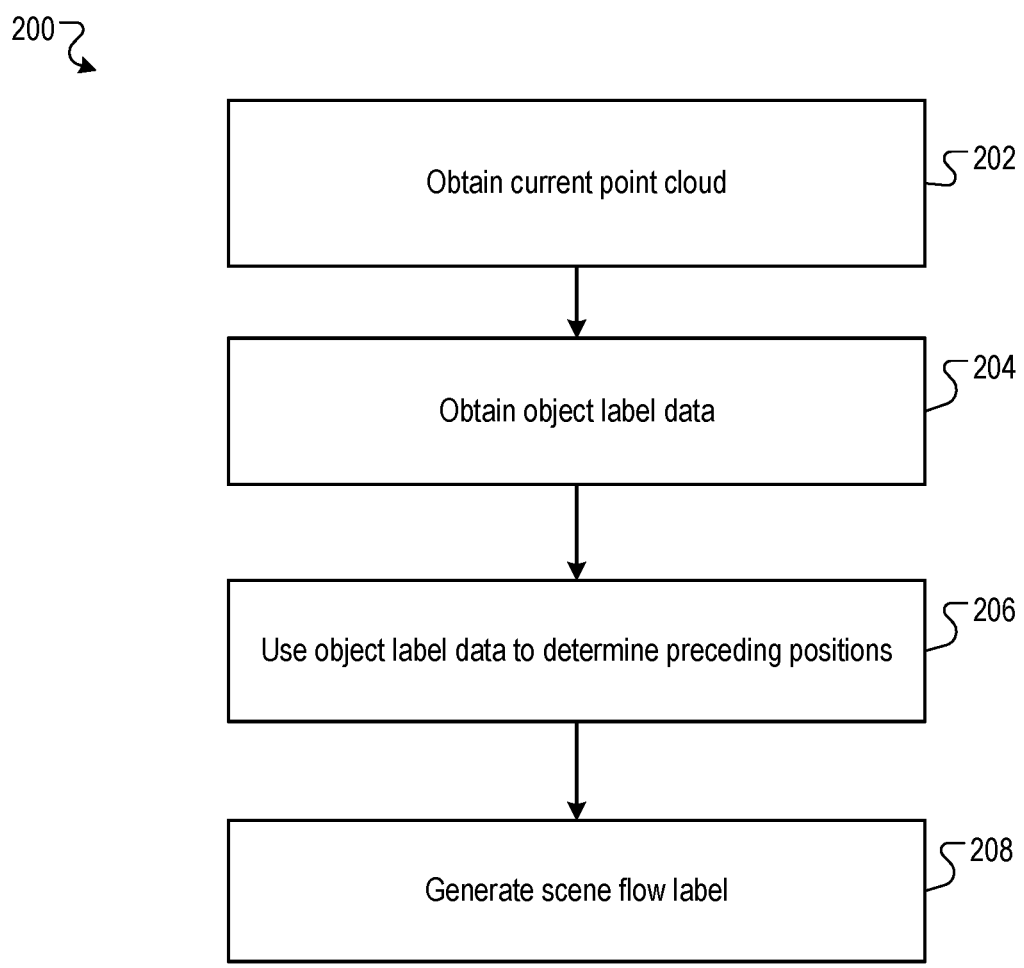
FIG. 2 is a flow diagram of an example process for generating a scene flow label.

FIG. 2 is a flow diagram of an example process 200 for generating a scene flow label. For convenience, the process 200 will be described as being performed by a system of one or more computers located in one or more locations. For example, a training system, e.g., the training system 120 of FIG. 1, appropriately programmed in accordance with this specification, can perform the process 200.

The system obtains a current point cloud (step 202). The current point cloud represents an observed scene at a current time point, i.e., at the time point that the current point cloud was captured, and includes multiple three-dimensional points. The current point cloud was generated from measurements of a sensor, e.g., a laser sensor on an autonomous vehicle or another agent, at the current time point. A "scene" as used in this specification is a region of an environment that is within sensing range of one or more sensors. The three-dimensional points in the current point cloud will be referred to in this specification as "current" three-dimensional points.

The system obtains object label data (step 204).

The object label data identifies one or more current three-dimensional regions in the observed scene at the current time point. For example, each current three-dimensional region can be a three-dimensional bounding box or a contour within the observed scene. Each current three-dimensional region has been labeled as containing an object at the current time point. That is, the object label data indicates that a different object is located within each of the one or more current three-dimensional regions. For example, the one or more current three-dimensional regions can have been generated based on user-submitted labels for the current point cloud or auto-labeling techniques applied to the current point cloud.

The object label data also identifies one or more preceding three-dimensional regions in the observed scene at a preceding time point, i.e., a time point that is earlier in time relative to the current time point, and in the reference frame of the sensor at the preceding time point. Because the sensor may have moved between the preceding time point and the current time point, e.g., if the sensor is mounted on a moving vehicle, the reference frame of the sensor at the preceding time point can be different from the reference frame of the sensor at the current time point. Each preceding three-dimensional region has been labeled as containing a different object at the preceding time point. That is, the object label data indicates that a different object was located within each of the one or more preceding three-dimensional regions at the preceding time point. For example, the one or more preceding three-dimensional regions can have been generated based on user-submitted labels for an earlier point cloud that was generated by the sensor at the preceding time point or auto-labeling techniques applied to the earlier point cloud.

For some of the current three-dimensional regions, the object label data can identify a corresponding preceding three-dimensional region in the observed scene at the preceding time point, i.e., a preceding region that has been labeled as containing the same object as the current region.

In some cases, for others of the current regions, the object label may not identify any corresponding preceding regions. For example, the object contained by a given current region may not have been within range of the sensor at the preceding time point or may have been occluded from the sensor at the preceding time point.

The system uses the object label data to determine respective preceding positions for some or all of the current points in the current point cloud (step 206). The preceding position of a given current point is the position, in the reference frame of the sensor at the current time point, of the given point at the preceding time point that is earlier than the current time point.

For example, for current points that are within a current three-dimensional region that has a corresponding preceding three-dimensional region, the system uses the object label data to identify the respective preceding positions for the current points.

Example techniques for determining the preceding position of such points are described below with reference to FIG. 3.

As another example, for current points that are not within any of the current three-dimensional regions, i.e., that have not been labeled as being returns from any object, the system can determine that the preceding positions for these points are the same as the current positions, i.e., that the point was stationary between the preceding time point and the current time point.

The system generates a scene flow label for the current point cloud (step 208).

The scene flow label for the current point cloud includes a respective ground truth motion vector for each of a plurality of the current points. For example, the scene flow label can include a respective ground truth motion vector for all of the current three-dimensional points in the current point cloud or can include a respective ground truth motion vector for only some, i.e., for only a proper subset, of the current three-dimensional points.

As a particular example, the motion vector for a given point can include, for each of multiple directions, a respective velocity component in the direction in the reference frame of the laser sensor at the current time point. The velocity component in a given direction represents the predicted velocity of the corresponding current point along the given direction at the current time point. For example, the motion vector can include respective velocities, e.g., in meters/second or another appropriate unit of measurement, for each of three dimensions: the x direction, the y direction, and the z direction.

For each current point for which a preceding position was determined at step 206, the system can generate the ground truth motion vector for the current point from the displacement between (i) the current position of the current point at the current time point in the reference frame of the sensor at the current time point and (ii) the preceding position of the current three-dimensional point at the preceding time point in the reference frame of the sensor at the current time point.

As a particular example, the system can compute the respective velocity component for each direction based on (i) a displacement along the direction between the current position and the preceding position and (ii) a time difference between the current time point and the preceding time point. The "displacement" along a direction is the difference in values of the coordinate for the direction between the current position and the preceding position. For example, the system can compute the component for each direction as the displacement along the direction divided by the time difference.

For each current three-dimensional region that does not have a corresponding preceding three-dimensional region, the system determines that the object label data indicates that the object contained within the current region was not detected in the observed scene at the preceding time point and in response, can include, in the scene flow label, data indicating that each current three-dimensional point within the current three-dimensional region does not have a valid motion vector at the current time point. That is, because the system cannot effectively use the object label data to identify the preceding position for these current points, the system does not include a valid motion vector for these points in the scene flow label.

Once the system has generated the scene flow label, the system can use the scene flow label to generate a training example for training a machine learning model to predict scene flow of input point clouds. For example, the training example can include the current point cloud, the earlier point cloud, and the scene flow label. In some implementations, the system then trains the machine learning model on training data that includes the training example. In some other implementations, the system can provide the training example to another system for use in training the machine learning model.

Figure 3:
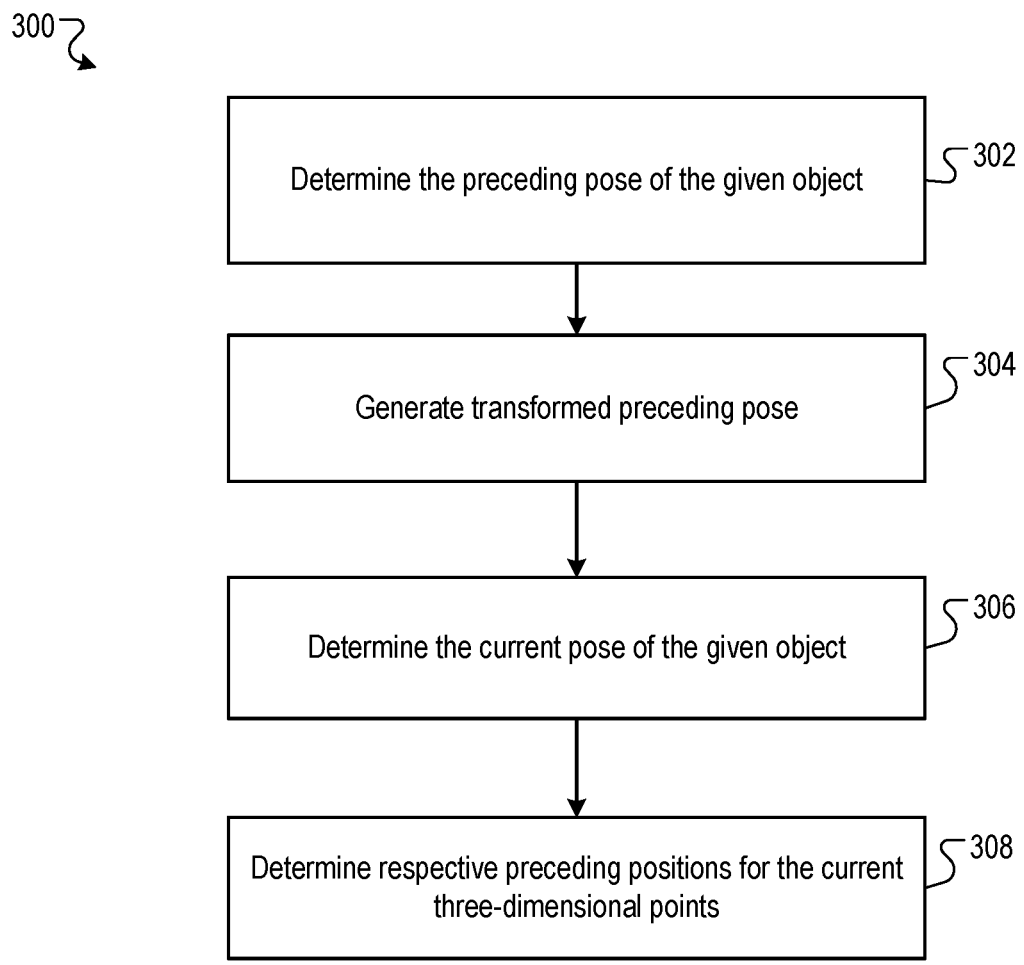
FIG. 3 is a flow diagram of an example process for generating preceding positions for current three-dimensional points in a current three-dimensional region.

FIG. 3 is a flow diagram of an example process 300 for determining preceding positions for the current points within a given current three-dimensional region. For convenience, the process 300 will be described as being performed by a system of one or more computers located in one or more locations. For example, a training system, e.g., the training system 120 of FIG. 1, appropriately programmed in accordance with this specification, can perform the process 300.

In particular, the given current three-dimensional region was identified as having a corresponding preceding three-dimensional region in the object label data, i.e., the object label data identified the current and preceding regions as containing the same given object.

The system determines, from a pose of the corresponding preceding three-dimensional region in the reference frame of the sensor at the preceding time point, the preceding pose of the given object at the preceding time point in the reference frame of the sensor at the preceding time point (step 302). That is, the system sets the preceding pose of the given object to be the pose of the corresponding preceding three-dimensional region. The pose of the corresponding preceding three-dimensional region can be represented as a transformation matrix that includes 3D translation and rotational components.

The system generates, from (i) the preceding pose of the given object and (ii) ego motion data characterizing motion of the sensor from the preceding time point to the current time point, a transformed preceding pose of the given object at the preceding time point that is in the reference frame of the sensor at the current time point (step 304).

The system can obtain the ego motion data for the sensor from, e.g., a global positioning system (GPS) or an inertial measurement unit (IMU) of the vehicle or other agent on which the sensor is mounted. That is, the system modifies the translational and rotational components within the transformation matrix to account for the ego motion of the sensor to place the preceding pose into the reference frame of the sensor at the current time point.

The system determines, from a pose of the given current three-dimensional region in the reference frame of the sensor at the current time point, a current pose of the given object at the current time point in the reference frame of the sensor at the current time point (step 306). That is, the system sets the current pose of the given object to be the pose of the given current three-dimensional region. The pose of the given current three-dimensional region can also be represented as a transformation matrix that includes 3D translation and rotational components.

The system determines, from the transformed preceding pose of the given object and the current pose of the given object, the respective preceding positions for each of the current three-dimensional points in the given current three-dimensional region (step 308).

In particular, the system can determine, from the transformed preceding pose and the current pose, a rigid body transform from the current time point to the preceding time point for the first object. For example, the system can represent the rigid body transform as a matrix and can compute the rigid body transform as being equal to a product of (i) the transformed preceding pose and (ii) the inverse of the current pose.

The system determines, for each of the current three-dimensional points in the current three-dimensional region, the preceding position of the current three-dimensional point by applying the rigid body transform to the current position of the current three-dimensional point. In particular, the system can compute the preceding position of a given current point as a product of the rigid body transform and the current position of the given current point.

As described above, existing neural network architectures for estimating scene flow from point clouds can only efficiently compute scene flow estimates for point clouds that have relatively few points.

Figure 4:
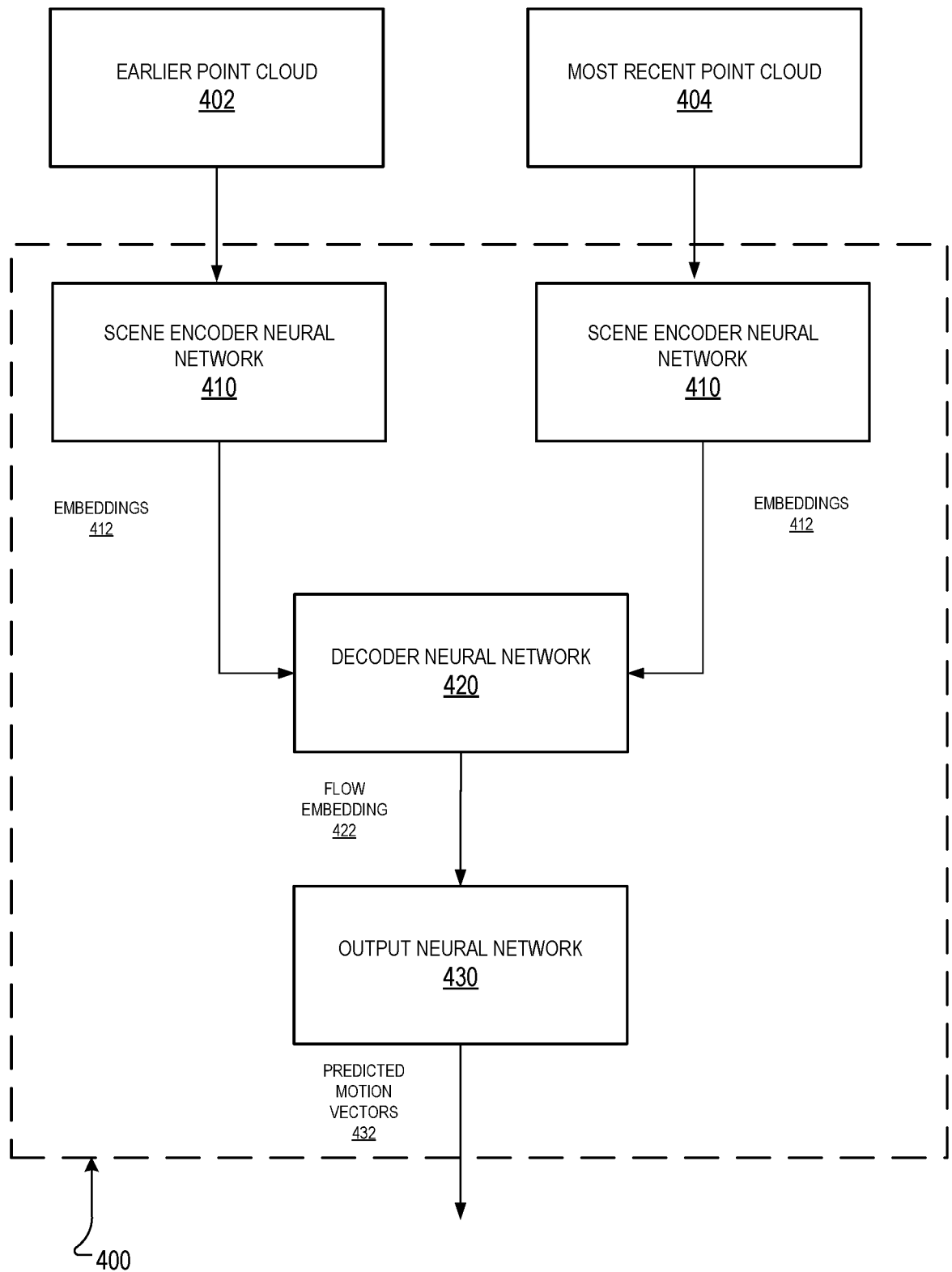
FIG. 4 shows an example architecture for a scene flow prediction neural network.

FIG. 4 shows an example architecture for a scene flow neural network 400 that can efficiently compute scene flow estimates for point clouds that have a much larger number of points, e.g., like point clouds generated by on-board sensors of autonomous vehicles.

In particular, the neural network 400 includes a scene encoder neural network 410, a decoder neural network 420, and an output neural network 430.

The neural network 400 receives as input an earlier point cloud 402 and a most recent point cloud 404. Optionally, prior to processing the point clouds, the neural network 400 can transform the earlier point cloud 402 into the reference frame of the most recent point cloud 404. By applying this transformation, the neural network 400 can remove the influence of the ego-motion of the sensor that generated the point clouds 402 and 404 on the scene flow predictions.

The encoder neural network 410 processes the point clouds 402 and 404 to generate embeddings 412 at different spatial resolutions for both point clouds. That is, for each point cloud, the neural network 400 processes the point cloud using the encoder neural network 410 to generate a set of embeddings 412 that includes a respective embedding at each of multiple spatial resolutions.

An "embedding" as used in this specification is an ordered collection of numerical values, e.g., a vector, a matrix, or higher-dimensional feature map of floating point or other numerical values.

As a particular example, the encoder neural network 410 can, for each point cloud, assign each point to a vertical column from a set of fixed vertical columns based on the spatial coordinates of the points in the point cloud, i.e., by assigning each point to the vertical column that has a center that is closest to the spatial coordinates of the point.

For each vertical column, the encoder neural network 410 can then aggregate features of the points assigned to the column to generate a spatial feature map that includes a respective aggregated feature for each vertical column. The encoder neural network 410 can then apply a 2D convolutional neural network over the spatial feature map to generate the respective embeddings 412 at each of the spatial resolutions.

To generate the features of the points assigned to a given vertical column, the encoder neural network 410 can compute the offset from the column center to each point that is assigned to the column. The encoder neural network 410 can generate the features of each point by concatenating the offset for the point, the coordinates of the center of the column, and the features of the point from the point cloud, e.g., intensity, second return, elongation, and so on. The encoder neural network 410 then aggregates the features of the points assigned to the vertical column, e.g., by summing or max-pooling the features. Optionally, the encoder neural network 410 can apply a linear transformation to the features of the points prior to aggregation.

The decoder neural network 420 receives as input a combination of the respective embeddings 412 and 414 of the point clouds 402 and 404. For example, the input to the decoder neural network 420 can include, for each spatial resolution, a concatenation of the embeddings having the spatial resolution. The decoder neural network 420 then processes the input to generate as output a flow embedding 422 that includes a respective embedding for each grid cell of a spatial grid over the most recent point cloud 402.

As a particular example, the decoder neural network 420 can be a 2D convolutional neural network, e.g., a convolutional neural network having a U-Net architecture.

For example, the decoder neural network 420 can apply a respective 2D convolution to each concatenated embedding to generate context embeddings at each of the different spatial resolutions. The decoder neural network 420 can then use these context embeddings as the skip connections within the U-Net architecture, which progressively merges context from consecutive resolutions.

The output neural network 430 then uses the flow embedding 422 to generate respective predicted motion vectors 432 for each of the points in the most recent point cloud 404.

In particular, the output neural network 430 can, for each point, identify the grid cell in the spatial grid to which the point belongs and then concatenate (i) the flow embedding for the identified grid cell and (ii) the point feature for the point, i.e., the feature that was provided as input to the aggregation operation described above, to generate a concatenated feature. The output neural network 430 can then process the concatenated feature using one or more neural network layers to generate the predicted motion vector 432 for the point. For example, the output neural network 430 can process the concatenated feature using a multi-layer perceptron (MLP) to generate the predicted motion vector 432.

Figure 5:
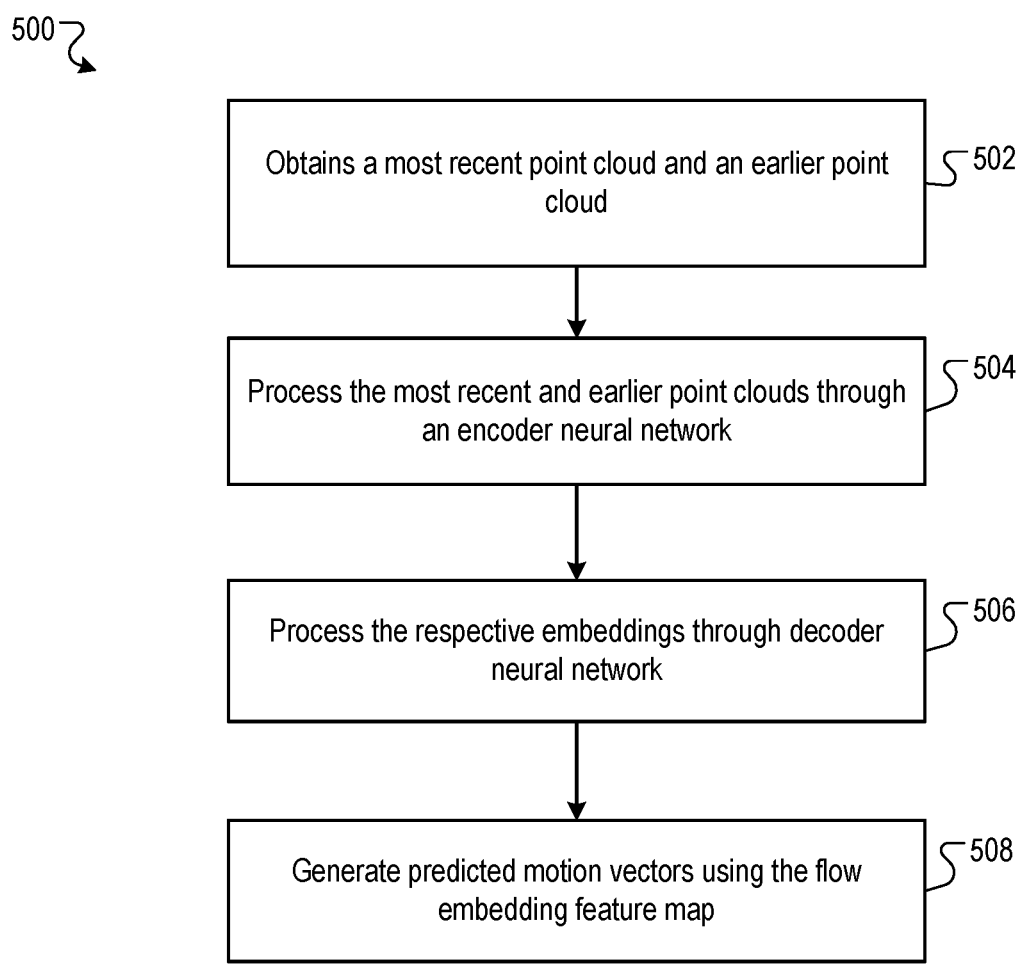
FIG. 5 is a flow diagram of an example process for generating a scene flow output.

FIG. 5 is a flow diagram of an example process 500 for generating a scene flow output for a most recent point cloud. For convenience, the process 500 will be described as being performed by a system of one or more computers located in one or more locations. For example, a scene flow prediction system, e.g., the scene flow prediction system 150 of FIG. 1, appropriately programmed in accordance with this specification, can perform the process 500.

At any given time point, the system can perform the process 500 using the most recent point cloud generated by a laser sensor and an earlier point cloud generated by the laser sensor to generate a respective predicted motion vector for each point in the most recent point cloud.

The system obtains a most recent point cloud and an earlier point cloud (step 502). The most recent point cloud and the earlier point cloud were captured by the same sensor, but the earlier point cloud was captured prior to the most recent point cloud.

Optionally, the system transforms the earlier point cloud into a reference frame of the sensor at the most recent time point, i.e., the time point at which the most recent point cloud was generated, prior to processing the point clouds to generate the scene flow output.

The system processes the most recent and earlier point clouds through an encoder neural network to generate respective embeddings for each of the most recent and earlier point clouds at each of a plurality of different spatial resolutions (step 504).

The system processes the respective embeddings for each of the first and second point clouds through a decoder neural network to generate a flow embedding feature map (step 506). The flow embedding feature map includes a respective flow embedding for each grid cell of a spatial grid over the most recent point cloud.

The system generates a respective predicted motion vector for each point in the most recent point cloud using the flow embedding feature map (step 508).

In particular, to generate the predicted motion vector for a given point in the most recent point cloud, the system can identify the grid cell in the spatial grid to which the given point belongs and then concatenate (i) the flow embedding for the identified grid cell and (ii) the point feature for the point to generate a concatenated feature. The system can then process the concatenated feature using one or more output neural network layers, e.g., using an MLP, to generate the predicted motion vector for the given point. In particular, the system can perform this process in parallel for all of the points in the most recent point cloud, allowing for predictions to be generated with low latency even when there is a large number of points in the point cloud.

Prior to using the encoder neural network, the decoder neural network, and the one or more output layers, the system can train these components on training examples generated as described above to optimize an appropriate objective function using any appropriate machine learning training technique, e.g., a gradient descent technique with any appropriate optimizer, e.g., stochastic gradient descent, Adam, rmsProp, or Adafactor. For example, the objective function can measure, for each training example, the average L2 loss for the current points in the current point cloud in the training example, where L2 loss for a given current point is the L2 loss between the motion vector in the scene flow label for the current point and the predicted motion vector generated by the neural network for the current point.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
   obtaining a current point cloud representing an observed scene at a current time point, wherein the current point cloud is generated from measurements of a sensor at the current time point, and wherein the current point cloud comprises a plurality of current three-dimensional points;
   obtaining object label data that identifies a first three-dimensional region in the observed scene that has been labeled as containing a first object in the observed scene at the current time point;
   determining, for each current three-dimensional point that is within the first three-dimensional region and using the object label data, a respective preceding position of the current three-dimensional point at a preceding time point in a reference frame of the sensor at the current time point; and
   generating a scene flow label for the current point cloud that comprises a respective ground truth motion vector for each of a plurality of the current three-dimensional points, wherein generating the scene flow label comprises:
      for each of the current three-dimensional points in the first three-dimensional region, generating the respective motion vector for the current three-dimensional point from a displacement between (i) a current position of the current three-dimensional point at the current time point in the reference frame of the sensor at the current time point and (ii) the preceding position of the current three-dimensional point at the preceding time point in the reference frame of the sensor at the current time point.

2. The method of claim 1, wherein the motion vector includes, for each of multiple directions, a respective velocity component in the direction in the reference frame of the sensor at the current time point.

3. The method of claim 2, wherein generating the respective motion vector for the current three-dimensional point from a displacement between (i) a current position of the current three-dimensional point at the current time point in the reference frame of the sensor at the current time point and (ii) the preceding position of the current three-dimensional point at the preceding time point comprises, for each of the multiple directions:
   computing the respective velocity component for the direction based on (i) a displacement along the direction between the current position and the preceding position and (ii) a time difference between the current time point and the preceding time point.

4. The method of claim 1, wherein the object label data also identifies a second three-dimensional region in the observed scene that is in a reference frame of the sensor at the preceding time point and that has been labeled as containing the first object at the preceding time point.

5. The method of claim 4, wherein determining, for each current three-dimensional point that is within the first three-dimensional region, a respective preceding position of the current three-dimensional point at a preceding time point in a reference frame of the sensor at the current time point comprises:
   determining, from a pose of the second three-dimensional region in the reference frame of the sensor at the preceding time point, a preceding pose of the first object at the preceding time point in the reference frame of the sensor at the preceding time point;
   generating, from (i) the preceding pose and (ii) ego motion data characterizing motion of the sensor from the preceding time point to the current time point, a transformed preceding pose of the first object at the preceding time point that is in the reference frame of the sensor at the current time point;
   determining, from a pose of the first three-dimensional region in the reference frame of the sensor at the current time point, a current pose of the first object at the current time point in the reference frame of the sensor at the current time point; and
   determining, from the transformed preceding pose and the current pose, the respective preceding positions for each of the current three-dimensional points in the first three-dimensional region.

6. The method of claim 5, wherein determining, from the transformed preceding pose and the current pose, the respective preceding positions for each of the current three-dimensional points in the first three-dimensional region comprises:
   determining, from the transformed preceding pose and the current pose, a rigid body transform from the current time point to the preceding time point for the first object; and
   for each of the current three-dimensional points in the first three-dimensional region, determining the preceding position of the current three-dimensional point by applying the rigid body transform to the current position of the current three-dimensional point.

7. The method of claim 1, wherein the object label data also identifies a third three-dimensional region in the observed scene in the reference frame of the sensor at the current time point that has been labeled as containing a second object in the observed scene at the current time point, and wherein generating the scene flow label for the current point comprises:
   determining that the object label data indicates that the second object was not detected in the observed scene at the preceding time point; and
   in response, including, in the scene flow label, data indicating that each current three-dimensional point within the third three-dimensional region does not have a valid motion vector at the current time point.

8. The method of claim 1, wherein generating the scene flow label for the current point cloud comprises:
   determining that one or more current three-dimensional points are not included in any regions identified as containing any objects at the current time point in the object label data; and
   in response, generating, for each of the one or more current three-dimensional points, a respective motion vector that indicates that the current three-dimensional point is stationary.

9. The method of claim 8, wherein generating the scene flow label for the current point cloud data comprises identifying each of the one or more current three-dimensional points as belonging to a background of the observed scene in the scene flow label.

10. The method of claim 1, further comprising:
generating, from at least the current point cloud and the scene flow label for the current point cloud, a training example for training a machine learning model to predict scene flow of input point clouds.

11. The method of claim 10, further comprising:
training the machine learning model on training data that includes the training example.

12. The method of claim 10, further comprising:
providing the training example for use in training the machine learning model.

13. One or more non-transitory computer-readable storage media storing instructions that when executed by one or more computers cause the one or more computers to perform operations comprising:
obtaining a current point cloud representing an observed scene at a current time point, wherein the current point cloud is generated from measurements of a sensor at the current time point, and wherein the current point cloud comprises a plurality of current three-dimensional points;
obtaining object label data that identifies a first three-dimensional region in the observed scene that has been labeled as containing a first object in the observed scene at the current time point;
determining, for each current three-dimensional point that is within the first three-dimensional region and using the object label data, a respective preceding position of the current three-dimensional point at a preceding time point in a reference frame of the sensor at the current time point; and
generating a scene flow label for the current point cloud that comprises a respective ground truth motion vector for each of a plurality of the current three-dimensional points, wherein generating the scene flow label comprises:
for each of the current three-dimensional points in the first three-dimensional region, generating the respective motion vector for the current three-dimensional point from a displacement between (i) a current position of the current three-dimensional point at the current time point in the reference frame of the sensor at the current time point and (ii) the preceding position of the current three-dimensional point at the preceding time point in the reference frame of the sensor at the current time point.

14. A system comprising:
one or more computers; and
one or more storage devices storing instructions that, when executed by the one or more computers, cause the one or more computers to perform operations comprising:
obtaining a current point cloud representing an observed scene at a current time point, wherein the current point cloud is generated from measurements of a sensor at the current time point, and wherein the current point cloud comprises a plurality of current three-dimensional points;
obtaining object label data that identifies a first three-dimensional region in the observed scene that has been labeled as containing a first object in the observed scene at the current time point;
determining, for each current three-dimensional point that is within the first three-dimensional region and using the object label data, a respective preceding position of the current three-dimensional point at a preceding time point in a reference frame of the sensor at the current time point; and
generating a scene flow label for the current point cloud that comprises a respective ground truth motion vector for each of a plurality of the current three-dimensional points, wherein generating the scene flow label comprises:
for each of the current three-dimensional points in the first three-dimensional region, generating the respective motion vector for the current three-dimensional point from a displacement between (i) a current position of the current three-dimensional point at the current time point in the reference frame of the sensor at the current time point and (ii) the preceding position of the current three-dimensional point at the preceding time point in the reference frame of the sensor at the current time point.

15. The system of claim 14, wherein the motion vector includes, for each of multiple directions, a respective velocity component in the direction in the reference frame of the sensor at the current time point.

16. The system of claim 15, wherein generating the respective motion vector for the current three-dimensional point from a displacement between (i) a current position of the current three-dimensional point at the current time point in the reference frame of the sensor at the current time point and (ii) the preceding position of the current three-dimensional point at the preceding time point comprises, for each of the multiple directions:
computing the respective velocity component for the direction based on (i) a displacement along the direction between the current position and the preceding position and (ii) a time difference between the current time point and the preceding time point.

17. The system of claim 14, wherein the object label data also identifies a second three-dimensional region in the observed scene that is in a reference frame of the sensor at the preceding time point and that has been labeled as containing the first object at the preceding time point.

18. The system of claim 17, wherein determining, for each current three-dimensional point that is within the first three-dimensional region, a respective preceding position of the current three-dimensional point at a preceding time point in a reference frame of the sensor at the current time point comprises:
determining, from a pose of the second three-dimensional region in the reference frame of the sensor at the preceding time point, a preceding pose of the first object at the preceding time point in the reference frame of the sensor at the preceding time point;
generating, from (i) the preceding pose and (ii) ego motion data characterizing motion of the sensor from the preceding time point to the current time point, a transformed preceding pose of the first object at the preceding time point that is in the reference frame of the sensor at the current time point;
determining, from a pose of the first three-dimensional region in the reference frame of the sensor at the current time point, a current pose of the first object at the current time point in the reference frame of the sensor at the current time point; and
determining, from the transformed preceding pose and the current pose, the respective preceding positions for each of the current three-dimensional points in the first three-dimensional region.

19. The system of claim 18, wherein determining, from the transformed preceding pose and the current pose, the respective preceding positions for each of the current three-dimensional points in the first three-dimensional region comprises:
- determining, from the transformed preceding pose and the current pose, a rigid body transform from the current time point to the preceding time point for the first object; and
- for each of the current three-dimensional points in the first three-dimensional region, determining the preceding position of the current three-dimensional point by applying the rigid body transform to the current position of the current three-dimensional point.

20. The system of claim 14, wherein the object label data also identifies a third three-dimensional region in the observed scene in the reference frame of the sensor at the current time point that has been labeled as containing a second object in the observed scene at the current time point, and wherein generating the scene flow label for the current point comprises:
- determining that the object label data indicates that the second object was not detected in the observed scene at the preceding time point; and
- in response, including, in the scene flow label, data indicating that each current three-dimensional point within the third three-dimensional region does not have a valid motion vector at the current time point.

* * * * *